United States Patent [19]

Cho

[11] Patent Number: 5,054,383
[45] Date of Patent: Oct. 8, 1991

[54] BAKING MACHINE PROVIDED WITH YOGURT MANUFACTURING DEVICE

[75] Inventor: Hae-Suk Cho, Suwon, Rep. of Korea

[73] Assignee: SamSung Electronics Co., Ltd., Rep. of Korea

[21] Appl. No.: 385,465

[22] Filed: Jul. 27, 1989

[30] Foreign Application Priority Data

Aug. 29, 1988 [KR] Rep. of Korea .................... 88-10989

[51] Int. Cl.$^5$ .............................................. A47J 27/00
[52] U.S. Cl. ......................................... 99/327; 99/331; 99/339; 99/348; 99/357; 99/453; 99/455; 99/468
[58] Field of Search .................. 99/348, 452, 453–455, 99/467, 466, 468; 366/144–146, 149, 314, 98; 62/342

[56] References Cited

U.S. PATENT DOCUMENTS

| | | | |
|---|---|---|---|
| 4,009,368 | 2/1977 | Faiure et al. | 99/453 |
| 4,070,957 | 1/1978 | Korekawa et al. | 99/455 |
| 4,163,472 | 8/1979 | Taylor | 99/453 |
| 4,195,561 | 4/1980 | Castanis | 99/455 |
| 4,202,258 | 5/1980 | Masuda et al. | 99/348 |
| 4,248,898 | 2/1981 | Taylor . | |
| 4,539,509 | 9/1985 | Ojima et al. | 366/98 |
| 4,802,407 | 2/1989 | Negri et al. | 366/146 |
| 4,870,896 | 10/1989 | Asahina | 99/348 |
| 4,903,589 | 2/1990 | Aoyama | 99/468 |
| 4,930,899 | 6/1990 | Aoyama | 366/144 |

FOREIGN PATENT DOCUMENTS 5912489 8/1983 Japan .
8809640 12/1988 PCT Int'l Appl. .................... 99/348

Primary Examiner—Simone Timothy F.
Attorney, Agent, or Firm—Robert E. Bushnell

[57] ABSTRACT

A baking machine provided with a yogurt manufacturing device and a manufacturing method thereof are disclosed with: a first heating means; a baking room; a first temperature sensor; a controller for controlling all components; a yogurt preparing vessel; a fermenting room for accommodating the yogurt manufacturing vessel; a temperature elevating device for elevating the fermenting room temperature; a second temperature sensing means for detecting the fermenting room temperature; and a temperature lowering device for lowering the fermenting room temperature. Through manipulations of selective switches, either yogurt can be manufactured simultaneously with the baking of bread, or only yogurt or only bread can be manufactured. Further, the fermenting temperature is controlled in such a manner that, if the fermenting room temperature is higher than the reference temperature, the fermenting room temperature elevating device is inactivated, and the temperature lowering device is activated, while, if the contrary case is met, the opposite procedure is carried out.

19 Claims, 8 Drawing Sheets

BAKING MACHINE PROVIDED WITH YOGURT MANUFACTURING DEVICE

FIELD OF THE INVENTION

The present invention relates to a baking machine provided with a yogurt manufacturing device and a manufacturing method thereof, and particularly to the device and method in which yogurt can be manufactured simultaneously with the baking of breads by using the commercially distributed milk, or in which only yogurt or only breads can be manufactured.

BACKGROUND OF THE INVENTION

Generally, the process for manufacturing of breads has a step of preparing primary and secondary doughs, the primary dough being manufactured by adding flour, water, sugar, yeast and other additives in a mixing apparatus and by operating selective switches, and the secondary dough being manufactured by making the primary dough pass through an aging period; a step of fermenting the secondary dough by maintaining it at a predetermined temperature (about 33°~37° C.) for a certain period of time; and a step of baking the fermented dough by heating it at the baking temperature of over 150° C., thereby completing the manufacturing process for making bread, with steps of baking being carried out in an automatic manner.

Meanwhile, yogurt is manufactured in such a manner that: defatted milk is concentrated to one half of the original volume; sugar is added in the amount of about 8%; it is subjected to a pasteurization at the baking temperature; it is cooled to a temperature of 25°~30° C.; and then it is subjected to fermentation for four hours at a temperature range of 33°~37° C. after adding seed bacteria by 2%, thereby completing the whole manufacturing process.

The above process has to be carried out at the optimum conditions, and fermentation is possible at the temperature of 28°~33° C. But if the temperature-subjected period of time is short compared with the total fermentation period, then no adverse effect will resulted.

Further, if commercially distributed milk is used as the raw material of the yogurt, the pasteurization step can be omitted.

Here, it is noted that the optimum fermenting temperature for a yogurt manufacturing process is the same as the fermenting temperature for the baking process in the baking oven, while the fermenting period of time for the yogurt manufacturing process is equal to the whole baking time.

SUMMARY OF THE INVENTION

Therefore it is the object of the present invention to provide a baking machine provided with a yogurt manufacturing device and a manufacturing method thereof, in which the heat required for baking is utilized for the preparation of yogurt by subjecting the yogurt-in-process to the dough preparing temperature (28° C.) and by shielding the high baking temperature (150°~160° C.), in order to produce yogurt drinkable in accompaniment with simultaneously manufactured bread, and in which either only the baking or only the yogurt manufacturing can be carried out.

BRIEF DESCRIPTION OF THE DRAWINGS

The above object and other advantages of the present invention will become more apparent by describing the preferred embodiment of the present invention in detail with reference to the attached drawings in which.

DESCRIPTION OF THE PREFERRED EMBODIMENTS

Figure 1:
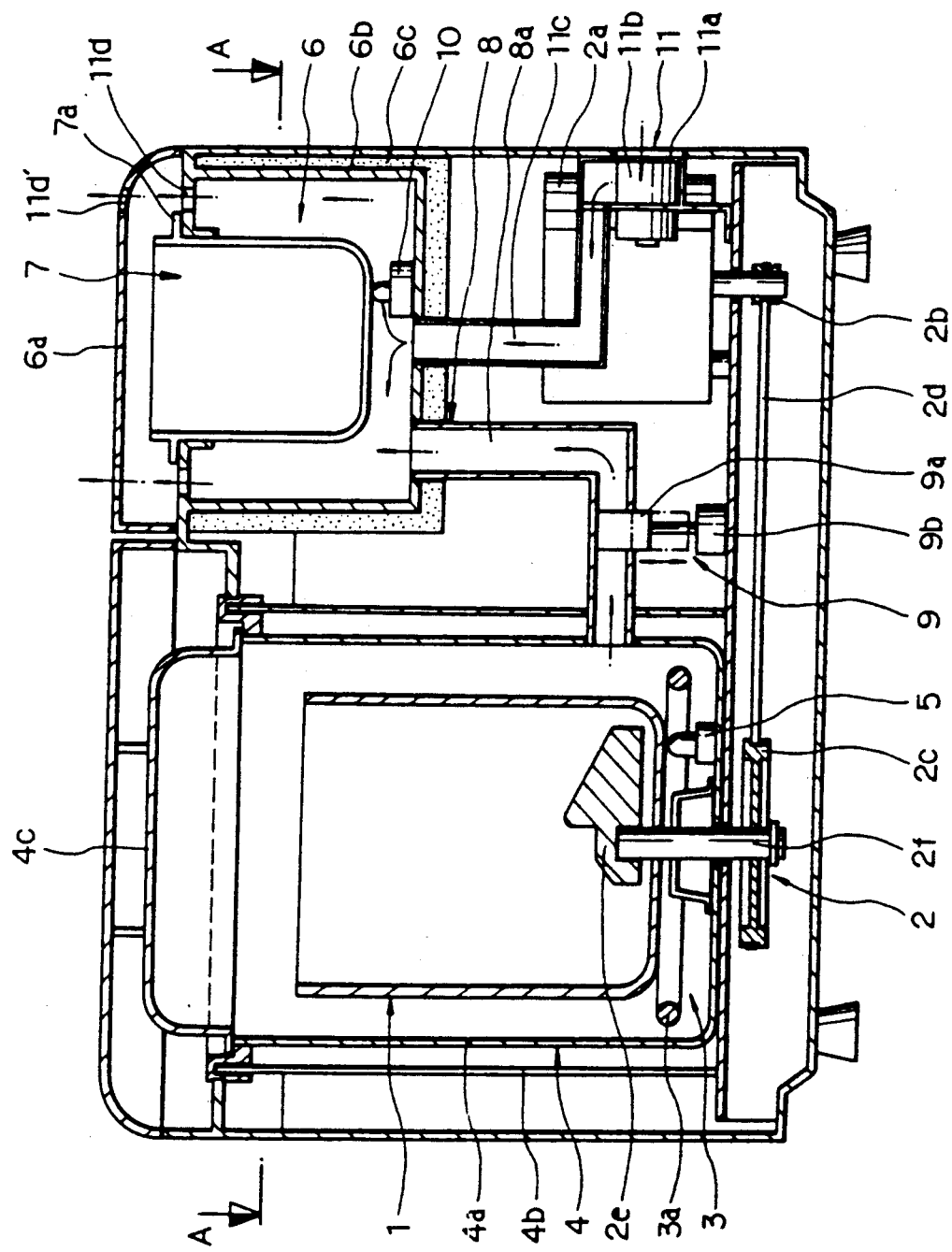
FIG. 1 is a vertical sectional view as viewed from the front showing the internal structure of the baking machine according to the present invention.

FIG. 1 is a vertical sectional view of the baking machine according to the present invention as viewed from the front, which shows a baking container 1; a dough preparing device having a dough motor 2a, a minor pulley 2b, a major pulley 2c, a motor belt 2d, a mixing blade 2e and a blade shaft 2f; a baking room 4 having a first heater 3, an inner wall 4a, a heat-insulating outer wall 4b and a first cover 4c, and also containing the baking container 1, the first heater 3 being provided with a heater 3a for heating raw breads; and a first temperature sensor 5 for detecting the temperature of the interior of the baking room 4, the whole baking process being controlled by a controller.

The baking machine constituted as described above also uses a fermenting room 6 having a second cover 6a being wrapped with a heat-insulating material 6c; a yogurt preparing vessel 7 having a suspending step 7a for suspending yogurt preparing vessel 7 from the top of the fermenting room 6; a fermenting room temperature elevating device 8 using a heat flow duct 8a for transferring the heat from baking room 4 to fermenting room 6; an opening/closing means 9 having of a damper 9a and a solenoid 9b, damper 9a being for opening/closing the heat flow duct 8a which constitutes the fermenting room temperature elevating means 8, and solenoid 9b for controlling the opening/closing operations of the said damper 9a; a second temperature sensor 10 for detecting the interior temperature of the said fermenting room; and a temperature lowering device having a cool air suction hole 11a, a fan motor 11b, a blowing duct 11c and hot air discharge holes 11d, 11d', for lowering the interior temperature of the fermenting room 6 upon elevation of the temperature above a predetermined level.

Figure 2:
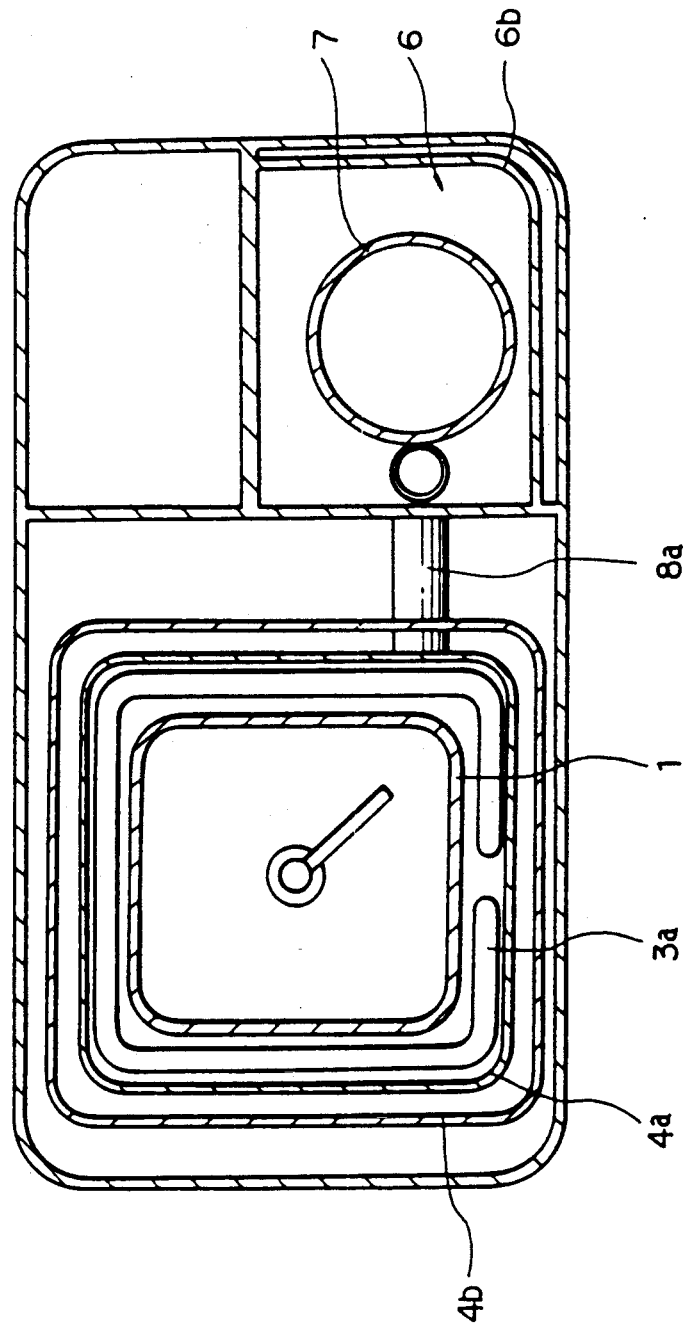
FIG. 2 is a sectional view taken along the line A—A of FIG. 1.
Figure 3:
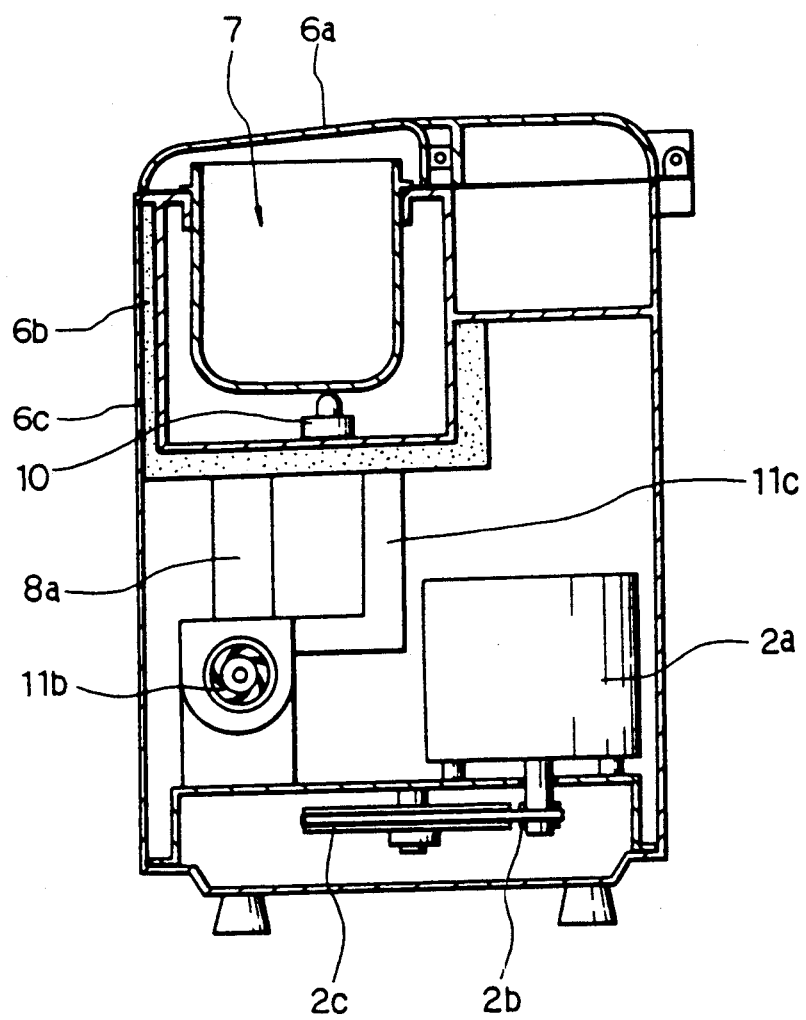
FIG. 3 is vertical sectional view as viewed from the side showing the internal structure of the baking machine according to the present invention.

FIG. 2 is a sectional view taken along the line A—A of FIG. 1, and FIG. 3 is a sectional view of the baking machine according to the present invention as viewed from the side.

Figure 4:
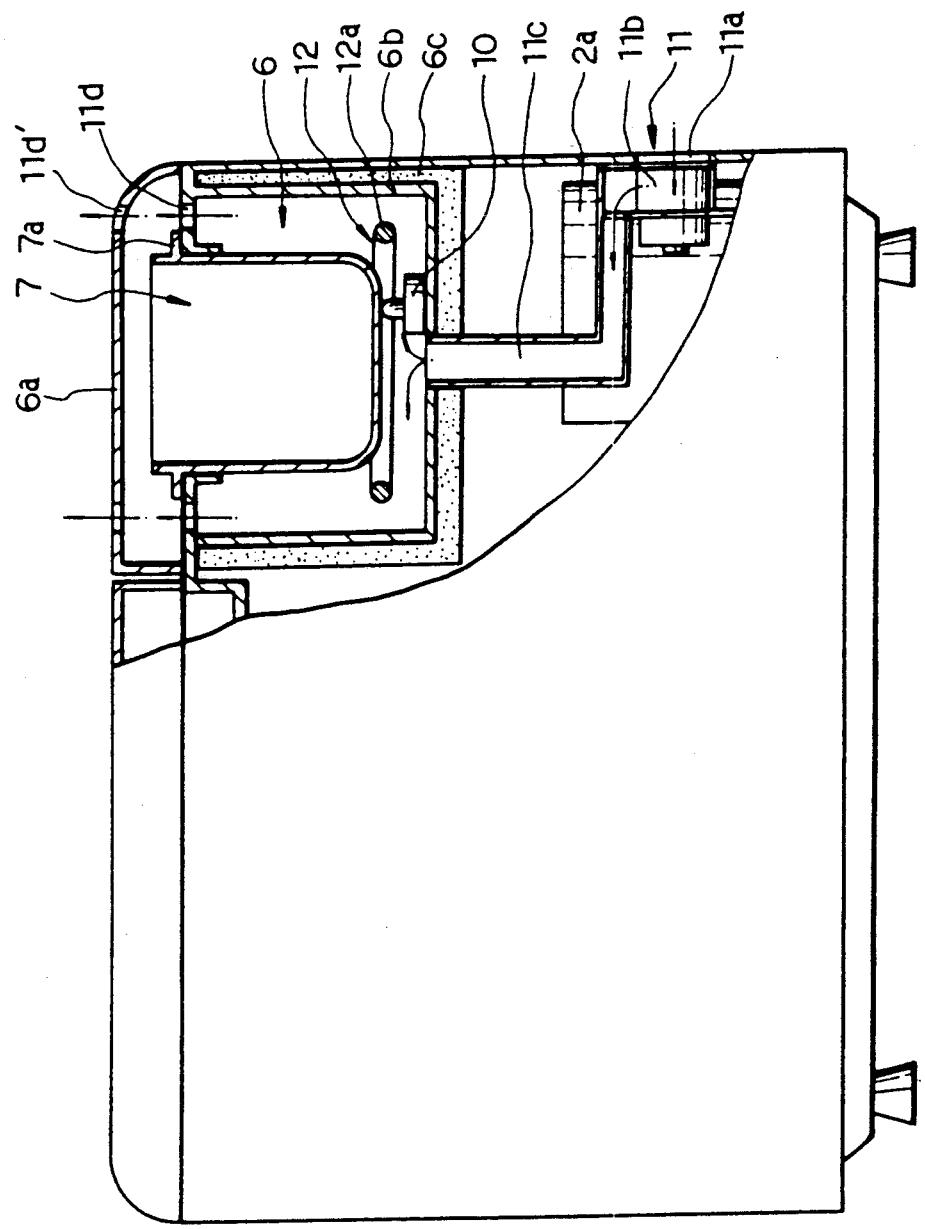
FIG. 4 illustrates another embodiment of the present invention showing an examplary case of a heating device installed in the fermenting room.

FIG. 4 illustrates another embodiment of the baking machine according to the present invention, in which the heat from the baking room 4 is not utilized through the fermenting room temperature elevating device 8, but a separate yogurt preparing heater 12a which constitutes a second heater 12 is installed within the fermenting room 6 to heat the fermenting room 6.

Figure 5:
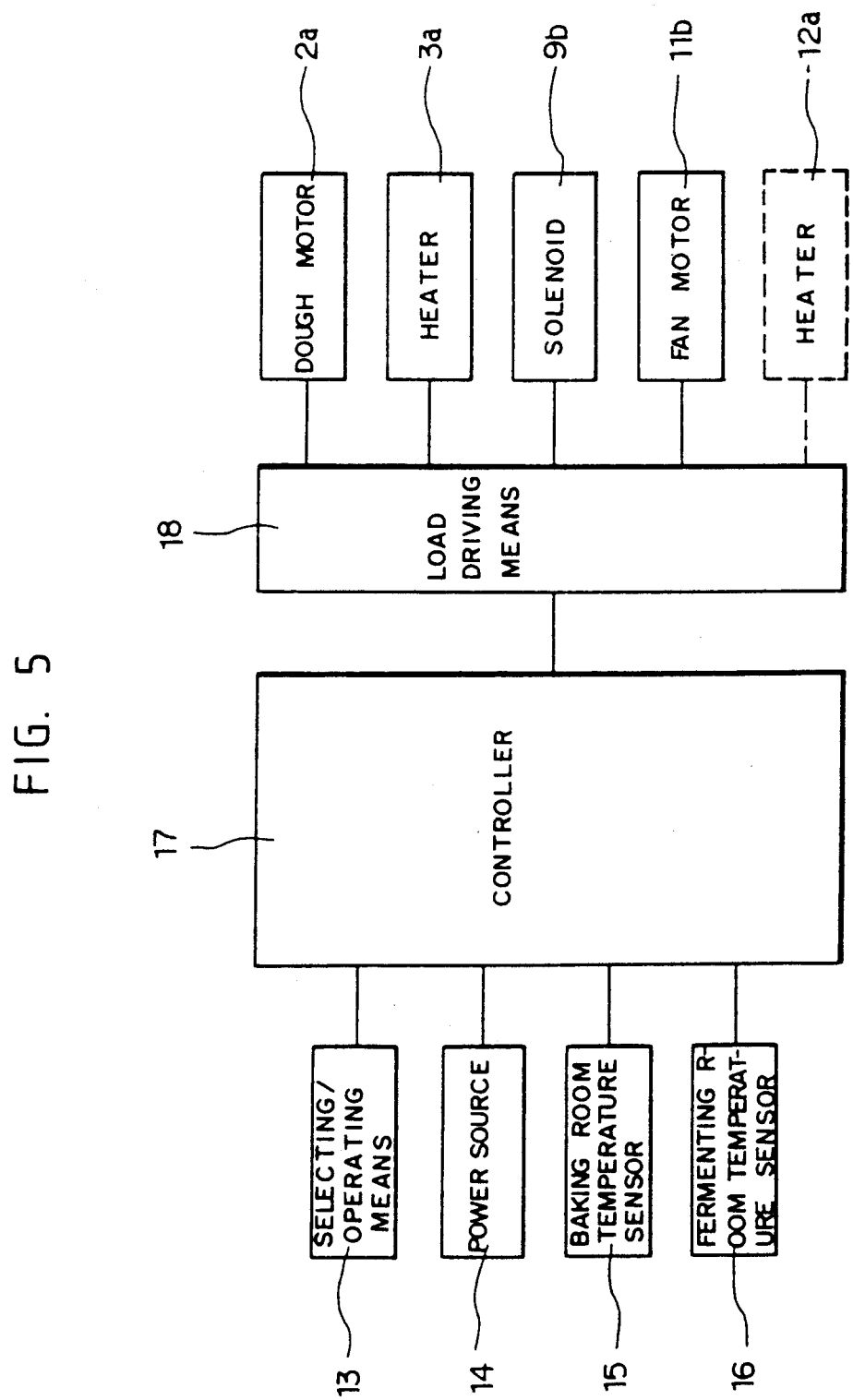
FIG. 5 is a block diagram of a control circuit for controlling the operation of the baking machine.

FIG. 5 is a block diagram of the control circuit for the baking machine according to the present invention, with a selecting/operating stage 13 for operating the switches selected based on the required functions; a power source 14 for supplying electric power after conversion of an AC source to a DC current; a baking room temperature sensor 15 using first temperature sensor 5 for detecting the interior temperature of the baking room 4; a fermenting room temperature sensor 16 using a second temperature sensor 10, for detecting the interior temperature of the fermenting room 6; a controller 17 for implementing the system operating program, and for providing control signals by comparing the incoming data with the reference data; and a load driver 18 for driving the dough motor 2a, the baking and yogurt preparing heaters 3a, 12a, the solenoid 9b and the fan motor 11b and the like in order to drive each of the loads.

Figure 8:
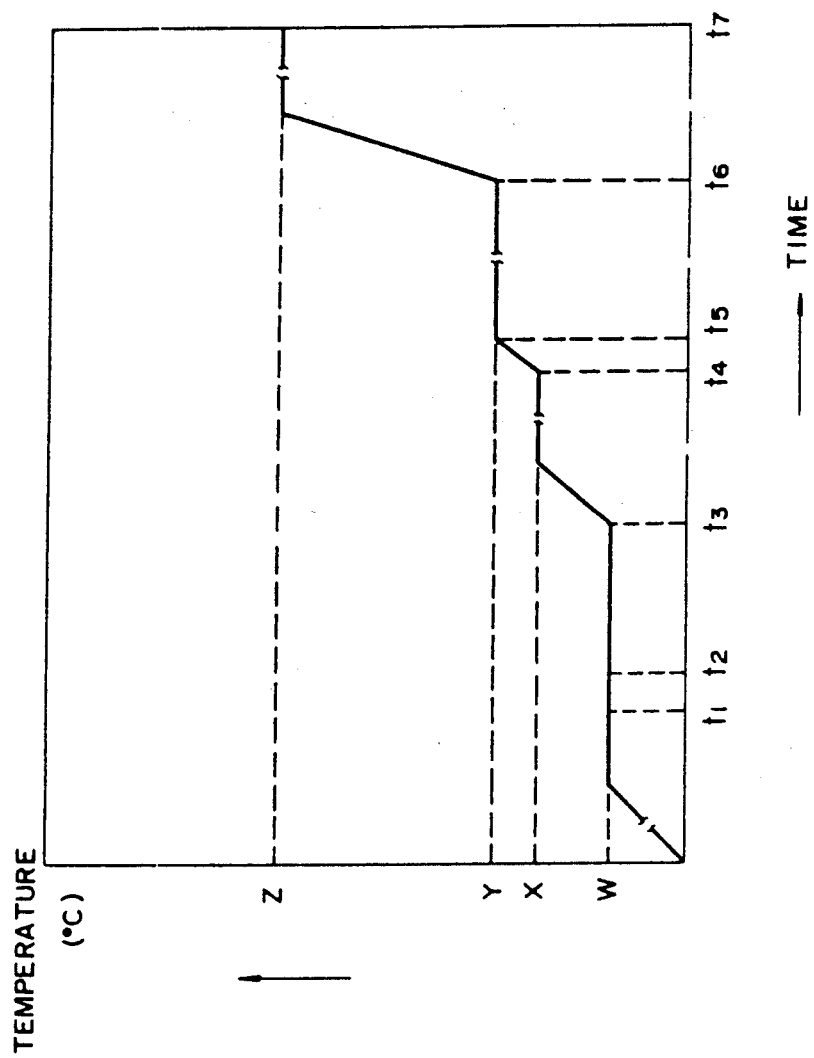
FIG. 8 is a temperature-time curve for the baking room of the baking machine used in the present invention.

FIG. 8 illustrates a temperature-time curve for the baking machine, in which the level W represents the temperature of the dough preparing process (about 28° C.), the level X represents the temperature of the first fermenting process (about 33° C.), the level Y represents the temperature of the second fermenting process (about 37° C.), and the level Z represents the temperature of the baking process (150° ~ 160° C.), while, on the time axis, t1 represents the primary dough preparing period (about 15 minutes), t2 represents the aging period (about 5 minutes), t3 represents the secondary dough preparing period (about 15 minutes), t4 represents the first fermenting period (about 76 minutes), t5 represents the gas discharge period (about 10 seconds), t6 represents the second fermenting period (about 50 minutes), and t7 represents the baking process period (about 40 minutes).

Figure 6:
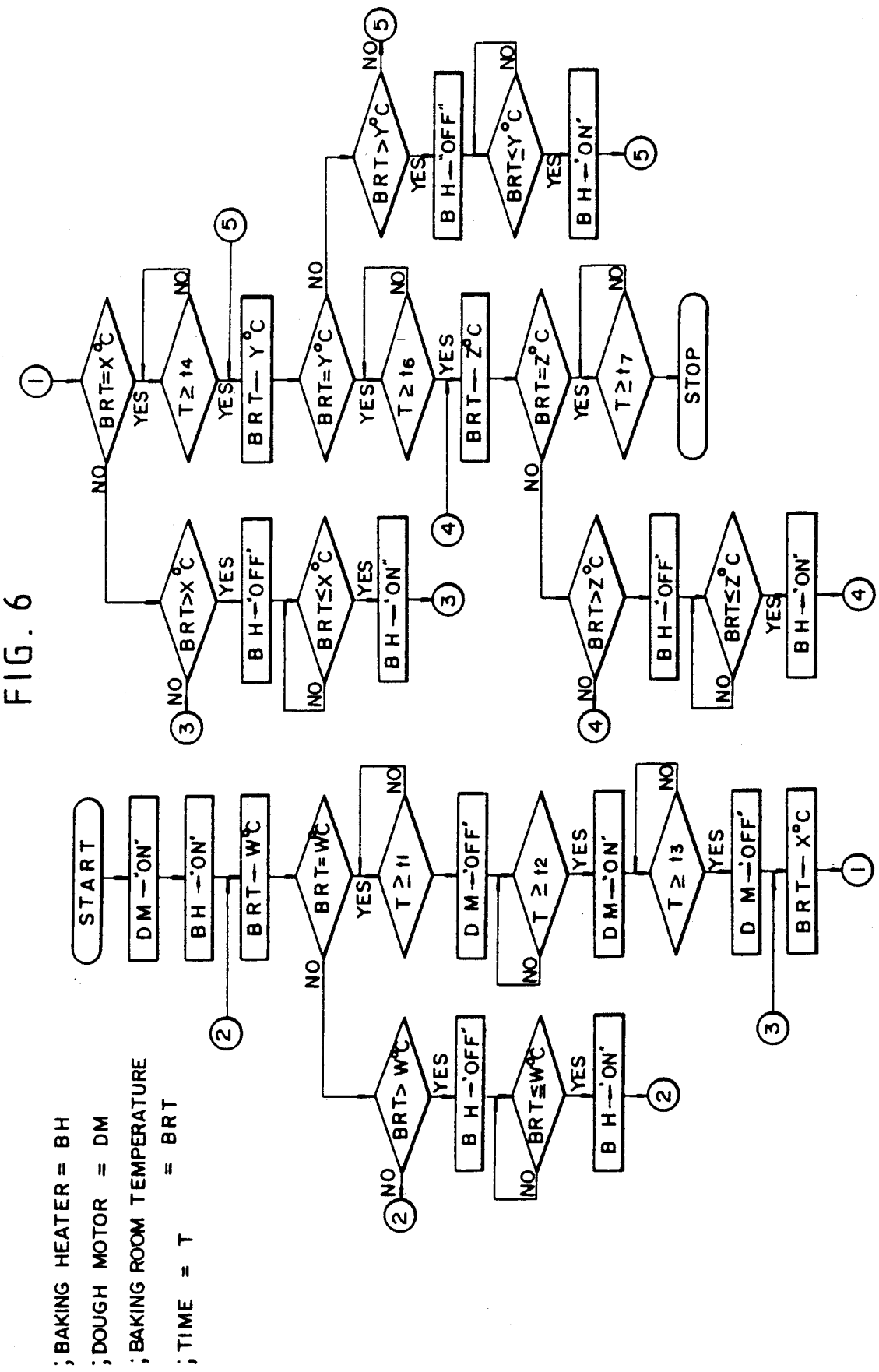
FIG. 6 is a flow chart for the baking process of the usual technique.
Figure 7:
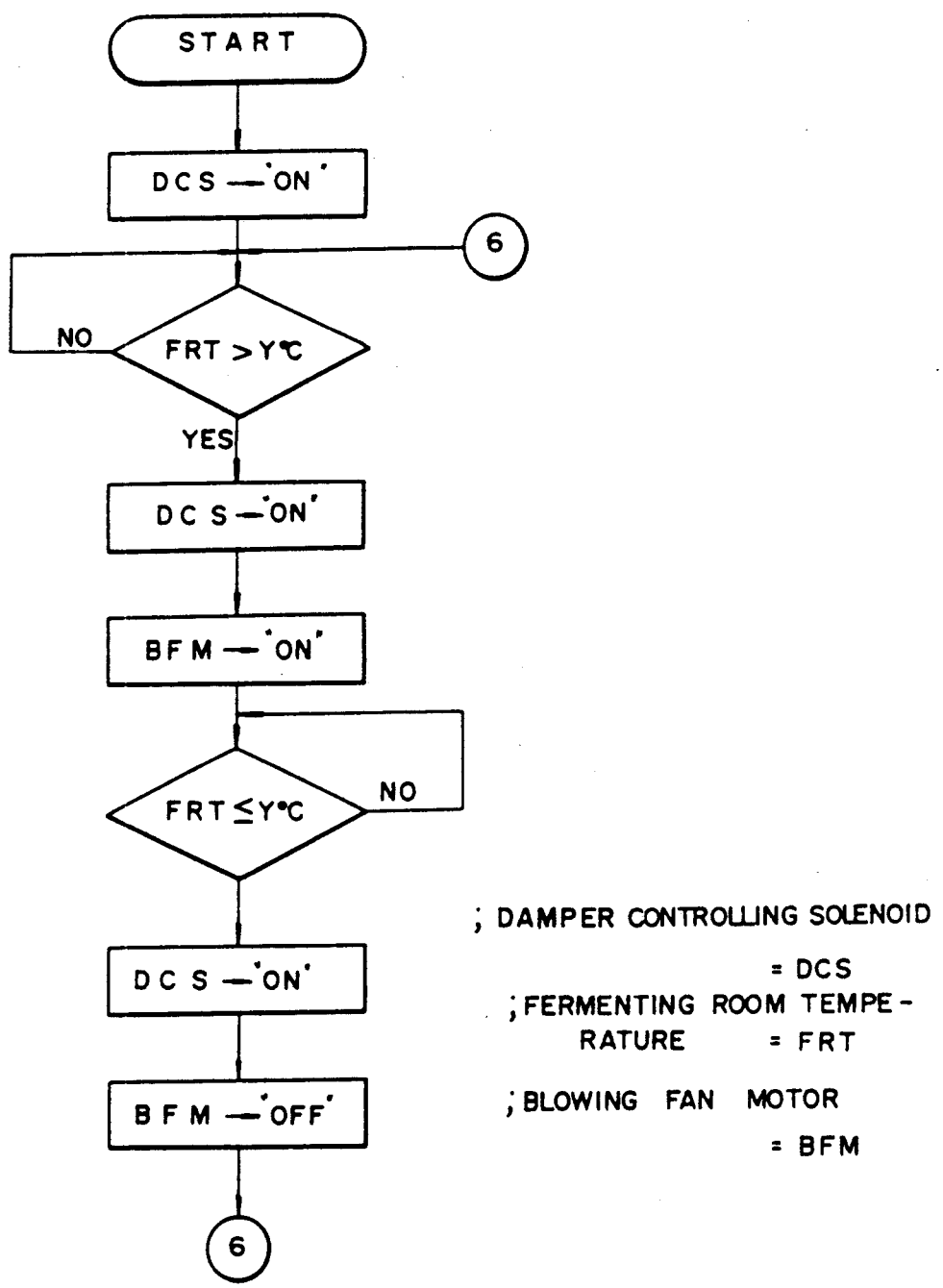
FIG. 7 is a flow chart for the yogurt manufacturing process according to the present invention.

FIG. 6 is a flow chart of the usual baking process, and FIG. 7 is a flow chart of the yogurt preparing process according to the present invention. Detailed descriptions will be presented below by referring to the said flow charts.

First, a mixture of flour, water, sugar, and yeast is charged into the baking container 1 of FIG. 1, and if the selective switches of the selecting/operating section 13 are turned on, the controller 17 will output control signals to the load driving means 18 to drive the dough motor 2a. As the dough motor 2a is being operated, the dynamic power transmission means such as the minor pulley 2b, the motor belt 2d, the major pulley 2c and the blade shaft 2f will revolve, so that the raw materials of bread contained within the baking container 1 should be processed into dough for bread by the said mixing blade 2e being rotated. Such dough preparing process is broken down into the primary dough process (terminated at t1), the aging period (terminated at t2) in which the driving of the dough motor 2a is stopped, and the secondary dough process (terminated at t3), the dough motor 2a being driven and stopped through the function of the controller.

When dough motor is being operated, the dynamic power transmission means such as the minor pulley 2b, the motor belt 2d, the major pulley 2c and the blade shaft 2e will be revolved, so that the raw materials of bread contained within the baking oven 1 should be processed into a dough for bread. Such dough preparing process is broken down into the primary dough process (terminated at t1), the aging period (terminated at t2) in which the driving of the dough motor 2a is stopped, and the secondary dough process (terminated at t3), the dough motor 2a being driven and stopped through the function of the controller.

Meanwhile, when the dough preparing process is progressing, the baking heater 3a installed within the baking room 4 is simultaneously turned on, so that the interior temperature of the baking room 4 should be kept at the optimum temperature (W), i.e., 28° C. during the dough preparing process. This temperature is lower than the optimum temperature (33° ~ 37° C.) for the fermenting in the yogurt manufacturing process, but even at this temperature, fermentation proceeds. Further the involved time (about 35 minutes) is very short compared with the whole process period (about 4 hours), and therefore, it can not adversely affect the quality of the yogurt thus manufactured.

After the completion of the dough preparing process, the fermenting process will be carried out, and this fermenting process is broken down into a first fermenting process (terminated at t4) during which the interior temperature of the baking room 4 is kept at the level X (about 33° C.), and a gas discharge step (terminated at t5), and a second fermenting process (terminated at t6) during which the interior temperature of the baking room 4 is maintained at the level Y (about 37° C.).

That is, the fermenting process (about 126 minutes) for the baking dough is carried out under the optimum yogurt fermenting temperature, and after completion of the fermenting process, the baking process is conducted in which the temperature is kept at the level Z (150° ~ 160° C.), the duration of the process being about 40 minutes (terminated at t7). The respective processes are carried out automatically by the controller 17 based on the system operating program, and in controlling the temperatures for the respective processes, the first temperature sensor 5 installed within the baking room 4, which uses baking room temperature sensor 15, detects the interior temperature of the baking room, and sends the signal to the controller which compares the incoming signal with the reference data in order to maintain the baking temperature at the optimum level.

As described above, the period of time required for carrying out the whole baking process is about 200 minutes, but, if the fermenting period is extended, good quality bread can be produced in 230 minutes.

If yogurt is to be manufactured simultaneously with the baking process, first it is required that the excessive temperature elevation in the interior of the yogurt preparing vessel 7 within the fermenting room 6 due to the baking process has to be prevented (the external temperature of the baking room being about 70° ~ 75° C.). For this purpose, a heat insulating material 6c is provided to surround the outside of the wall 6b of the fermenting room 6.

The yogurt manufacturing process related to the baking process as described above will be described below.

If the operation of the baking machine is started by manipulating the selective switches of the selecting-/operating means 13, the controller 17 will output a control signal to the load driving means 18 to activate the solenoid 9b. Then the damper 9a which has been blocking the heat flow duct 8a of the fermenting room temperature elevating means 8 will be opened, and at the same time, the heat will be introduced through heat flow duct 8a into the fermenting room 6 from the baking heater 3a which constitutes the baking room heater 3, thereby fermenting the raw material of the yogurt contained in the yogurt preparing vessel 7.

Under this condition, the fermenting room temperature sensor 16 which uses second temperature sensor 10 installed within the fermenting room 6 will send a sensing signal to the controller 17, and the controller 17, upon receipt of the sensing signal, will compared it with the reference data (the level Y). If it is found as the result of the comparation that the interior temperature of the fermenting room 6 is higher than the reference data, i.e., the level Y (37° C.), then the solenoid 9b will be turned off so as for the heat flow duct 8a to be blocked, and at the same time, the fan motor 11b will be activated, so that the external cool air should be sucked through the cool air suction hole 11a and the blowing duct 11c into the fermenting room 6, and should be discharged through the hot air discharge duct holes 11d, 11d' to the outside, thereby lowering the interior temperature of the fermenting room 6.

Thereafter, if the interior temperature of the fermenting room 6 is dropped below the reference level, then the solenoid 9b is activated again to let the damper 9a open the heat flow duct 8a, and at the same time, the fan motor 11b will be turned off, so that the interior temperature of the fermenting room 6 should be maintained at the optimum temperature all the time, thereby making it possible to manufacture yogurt simultaneously with bread.

Further, in accordance with the selection of mode, either only bread or only yogurt can be manufactured. In the case where only the baking process is carried out, the solenoid 9b is kept at an OFF state, so that the heat flow duct 9b should be blocked until the completion of the whole baking process.

In the case where only the yogurt preparing process is carried out, the controller 17 will receive signals from the fermenting room temperature sensor 16 which constitutes the second temperature sensing means 10 installed within the fermenting room 6, and upon receipt of such a signal, the controller 17 will control different components such as the baking heater 3a as the baking room heater 3, the damper controlling solenoid 9b as the heat flow opening/closing device 9, and the blowing fan motor 11b as the temperature lowering device 11, so that the yogurt raw material contained in the yogurt preparing vessel 7 should be fermented at the optimum temperature.

Further, as shown in FIG. 4, a separate heater 12a as the temperature elevating device 8 can be installed within the fermenting room 6, and, in accordance with the signal emitted by the fermenting room temperature sensor 16 which uses the second temperature sensor 10, the yogurt preparing heater 12a and blower fan motor 11b as the temperature lowering device 11 can be controlled, so that either yogurt can be manufactured simultaneously with the baking of bread, or either only bread or only yogurt can be manufactured.

As described above, the baking machine according to the present invention incorporates a yogurt manufacturing device into it, and therefore, has the advantage that yogurt can be manufactured simultaneously with the baking of breads, or either only breads or only yogurt can be manufactured.

What is claimed is:

1. A baking machine provided with a yogurt manufacturing device, having first heating means, a baking room, first temperature sensing means, and a controller for controlling all the components, comprising:
    a yogurt preparing vessel;
    a fermenting room accommodating said yogurt preparing vessel, and having inner and outer walls for maintaining a fermenting atmosphere;
    temperature elevating means for elevating the interior temperature of the fermenting room;
    second temperature sensing means for detecting the interior temperature of said fermenting room;
    temperature lowering means for lowering the interior temperature of the fermenting room upon elevation of the interior temperature above a level, and
    wherein either yogurt can be manufactured simultaneously with the baking of bread, or only yogurt or only bread can be manufactured.

2. The baking machine provided with a yogurt manufacturing device as claimed in claim 1, wherein said temperature elevating means comprises:
    a heat flow duct connected between the baking room; and
    the fermenting room; and
    means for opening/closing the duct.

3. The baking machine provided with a yogurt manufacturing device as claimed in claim 1, wherein the temperture elevating means comprises heating means separate from said first heating means, said separate heating means having a yogurt preparing heater installed under the yogurt preparing vessel.

4. The baking machine provide with a yogurt manufacturing device as claimed in claim 2, wherein said heat flow duct opening/closing means comprises a damper and a solenoid for controlling said damper.

5. The baking machine provided with a yogurt manufacturing device as claimed in claim 1, wherein said temperature lowering means comprises:
    a cool air suction hole,
    a blowing duct,
    a fan interposed between said cool air suction hole and said blowing duct, and
    hot air discharge holes.

6. The baking machine of claim 2, wherein said temperature elevating means further comprises separate heating means installed under the yogurt preparing vessel.

7. The baking machine of claim 6, wherein said heat flow duct opening/closing means comprises:
    a damper, and
    means for controlling said damper.

8. The baking machine of claim 7, wherein said temperature lowering means comprises:
    a cool air suction hole,
    a blowing duct,
    a fan interposed between said cool air suction hole and said blowing duct, and
    hot air discharge holes.

9. The baking machine of claim 8, wherein said controlling means comprises means for:
    regulating said means for controlling said damper and controlling said fan to maintain said interior temperature of said fermenting room at a first value for a first period; and
    subsequent to said first period, regulating said means for controlling said damper and controlling said fan to maintain said internal temperature of said fermenting room at a second value different from said first value, for a second period.

10. A baking machine, comprising:
a baking chamber;
first means for heating said baking chamber;
first temperature sensing means for detecting interior temperature of said baking chamber;
a preparing vessel;
a fermenting room accommodating said preparing vessel, said fermenting room having inner and outer walls;
means for elevating temperature within the interior of the fermenting room;
second temperature sensing means for detecting interior temperature of said fermenting room;
temperature lowering means for lowering the interior temperature of the fermenting room on elevation of the interior temperature of said fermenting room above a level; and
means for controlling said first heating means, said temperature elevating means and said temperature lowering means in dependence upon said first temperature sensing means and said second temperature sensing means.

11. The baking machine of provided with a yogurt manufacturing device as claimed in claim 10, wherein said temperature elevating means comprises:
a heat flow duct connected between the baking room; and
the fermenting room; and
means for opening/closing the duct.

12. The baking machine provided with a yogurt manufacturing device as claimed in claimm 11, wherein said heat flow duct opening/closing means comprises a damper and a solenoid for controlling said damper.

13. The baking machine, provided with a yogurt manufacturing device as claimed in claim 10, wherein said temperature lowering means comprises:
a cool air suction hole,
a blowing duct,
a fan interposed between said cool air suction hole and said blowing duct, and
hot air discharge holes.

14. The baking machine provided with a yogurt manufacturing device as claimed in claim 12, wherein said temperature lowering means comprises:
a cool air suction hole,
a blowing duct,
a fan interposed between said cool air suction hole and said blowing duct, and
hot air discharge holes.

15. The baking machine provided with a yogurt manufacturing device as claimed in claim 10, wherein the temperature elevating means comprises heating means separate from said first heating means, said separate heating means having a yogurt preparing heater installed under the yogurt preparing vessel.

16. The baking machine of claim 10, wherein said controlling means comprises means for:
maintaining said interior temperature of said fermenting room at a first value for a first period; and
subsequent to said first period, maintaining said interior temperature of said fermenting room at a second value different from said first value, for a second period.

17. The baking machine of claim 10, wherein said controlling means comprises means for:
operating said temperature elevating means to enable heat from said baking chamber to flow into said fermenting room while controlling said temperature elevating means and said temperture lowering means to maintain said interior temperature of said fermenting room at a first value for a first period; and
subsequent to said first period, operating said temperature elevating means to enable heat from said baking chamber to flow into said fermenting room while controlling said temperature elevating means and said temperature lowering means to maintain said interior temperture of said fermenting room at a second value different from said first value, for a second period.

18. The baking machine of claim 14, wherein said controlling means comprises means for:
regulating said means for controlling said damper and controlling said fan to maintain said interior temperature of said fermenting room at a first value for a first period; and
subsequent to said first period, regulating said means for controlling said damper and controlling said fan to maintain said internal temperature of said fermenting room at a second value different from said first value, for a second period.

19. The baking machine of claim 13, wherein said controllin means comprises means for:
regulating said means for controlling said damper and controlling said fan to maintain said interior temperature of said fermenting room at a first value for a first period; and
subsequent to said first period, regulating said means for controlling said damper and controlling said fan to maintain said internal temperature of said fermenting room at a second value different from said first value, for a second period.

* * * * *

UNITED STATES PATENT AND TRADEMARK OFFICE
CERTIFICATE OF CORRECTION

PATENT NO. : 5,054,383

DATED : 8 October 1991

INVENTOR(S) : Hae-Suk CHO

It is certified that error appears in the above-identified patent and that said Letters Patent is hereby corrected as shown below:

Column 1, Lines 44 and 45, change "resulted" to --result--;

Column 2, Line 40, change "breads" to --bread--;

Line 52, change "means" to --device--, and delete "of";

Column 3, Line 67, delete "means";

UNITED STATES PATENT AND TRADEMARK OFFICE
CERTIFICATE OF CORRECTION

PATENT NO. : 5,054,383

DATED : October 8, 1991

INVENTOR(S) : Hae-Suk Cho

It is certified that error appears in the above-identified patent and that said Letters Patent is hereby corrected as shown below:

Column 3, line 54, delete "means".

Claim 4, Column 6, Line 33, change "provide" to --provided--;

Claim 12, Column 7, Line 33, change "claimm" to --claim--.

Signed and Sealed this

Ninth Day of March, 1993

Attest:

STEPHEN G. KUNIN

Attesting Officer

Acting Commissioner of Patents and Trademarks